(12) United States Patent
Bailey (10) Patent No.: US 8,165,790 B2
(45) Date of Patent: Apr. 24, 2012

(54) DYNAMIC WEATHER SELECTION (75) Inventor: Louis J. Bailey, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/547,821

(22) Filed: Aug. 26, 2009

(65) Prior Publication Data

US 2011/0054718 A1 Mar. 3, 2011

(51) Int. Cl.
G05D 1/00 (2006.01)
G01S 13/95 (2006.01)

(52) U.S. Cl. ............ 701/120; 340/901; 701/10; 701/14

(58) Field of Classification Search ............ 701/120, 701/10, 9, 14, 16; 340/901, 949; 244/75.1
See application file for complete search history.

(56) References Cited

U.S. PATENT DOCUMENTS

| | | | |
|---|---|---|---|
| 5,999,882 A | 12/1999 | Simpson et al. | |
| 6,031,455 A | 2/2000 | Grube et al. | |
| 6,501,392 B2 * | 12/2002 | Gremmert et al. | 340/971 |
| 6,608,559 B1 | 8/2003 | Lemelson et al. | |
| 6,744,382 B1 * | 6/2004 | Lapis et al. | 340/971 |
| 6,816,780 B2 | 11/2004 | Naimer et al. | |
| 6,828,922 B1 | 12/2004 | Gremmert et al. | |
| 6,937,937 B1 | 8/2005 | Manfred et al. | |
| 7,181,346 B1 * | 2/2007 | Kleist et al. | 702/3 |
| 7,269,568 B2 | 9/2007 | Stiles et al. | |
| 7,633,428 B1 * | 12/2009 | McCusker et al. | 342/26 B |
| 7,945,355 B2 | 5/2011 | Akalinli et al. | |
| 7,966,122 B2 | 6/2011 | Flynn et al. | |
| 2003/0130894 A1 | 7/2003 | Huettner et al. | |
| 2005/0182675 A1 | 8/2005 | Huettner | |
| 2005/0187741 A1 * | 8/2005 | Gilbert | 703/2 |
| 2006/0259234 A1 | 11/2006 | Flynn et al. | |
| 2007/0179703 A1 | 8/2007 | Soussiel et al. | |
| 2009/0012663 A1 | 1/2009 | Mead et al. | |
| 2010/0049382 A1 * | 2/2010 | Akalinli et al. | 701/14 |
| 2010/0152931 A1 | 6/2010 | Lacombe et al. | |
| 2011/0050458 A1 | 3/2011 | Bailey et al. | |

FOREIGN PATENT DOCUMENTS

WO 2005079179 A1 9/2005

OTHER PUBLICATIONS

Gill et al., "Wind Nowcasting to Support Continuous Descent Approaches", UK Met office, Exeter, UK, pp. 1-8, retrieved Jul. 6, 2009 from http://ams.confex.com/ams/pdfpapers/131776.pdf.
USPTO Office Action dated Oct. 18, 2011 for U.S. Appl. No. 12/547,809.
International Search Report for Application No. EP10173909 dated Dec. 1, 2010.
USPTO office action for U.S. Appl. No. 12/547,809 dated Apr. 4, 2011.
U.S. Appl. No. 12/547,809, filed Aug. 26, 2009, Bailey et al.

* cited by examiner

*Primary Examiner* — Tan Q Nguyen
(74) *Attorney, Agent, or Firm* — Yee & Associates, P.C.

(57) ABSTRACT

The different advantageous embodiments provide a system comprising a weather band selection process and a processor unit. The processor unit is configured to run the weather band selection process. The weather band selection process identifies a flight trajectory associated with an aircraft, identifies weather information for the flight trajectory, and identifies a weather band selection for the aircraft using the flight trajectory, aircraft information and the weather information.

25 Claims, 8 Drawing Sheets

DYNAMIC WEATHER SELECTION

CROSS REFERENCE TO RELATED APPLICATIONS

This application is related to commonly assigned and co-pending U.S. patent application Ser. No. 12/547,809 entitled "Dynamic Environmental Information Transmission", which is hereby incorporated by reference.

BACKGROUND INFORMATION

1. Field

The present disclosure relates generally to aircraft and in particular to a method and apparatus for providing weather information for a trajectory of an aircraft. Still more particularly, the present disclosure relates to a method and apparatus for dynamically selecting three or four dimensional weather information for use in planning and updating flight trajectories.

2. Background

Weather information is used both during the planning and execution of flight operations. Planning flight operations results in the creation of flight plans. Flight plans are used to document basic information such as departure and arrival points, estimated time en route, various waypoints the aircraft must traverse en route, information pertaining to those waypoints, such as altitude and speed, information relating to legs of the flight between those waypoints, and aircraft predicted performance. This type of flight plan may be used to construct a flight trajectory including the various legs of the flight, which are connected to the various waypoints along the route. This flight trajectory may include a lateral trajectory defined in the horizontal plane and a vertical trajectory defined in the vertical plane.

Weather information for the route between the departure and arrival points, including information about forecasted weather for the various waypoints along the route, may affect a flight trajectory. For example, if incorrect weather is forecasted for a particular waypoint along the route of the flight plan, certain predictions for the flight path may become inaccurate, such as speed, fuel consumption, and time en route.

Additionally, revision of a flight plan may include deleting or adding waypoints, modifying the position of waypoints, or modifying the characteristics pertaining to the waypoints or legs between the waypoints, characteristics such as speed, time, or altitude, for example. The characteristics for various waypoints or legs between waypoints may include weather bands. A weather band is a collection of weather information for a specific geospatial point, such as a specific altitude or a specific three or four dimensional point in space. Weather information may include factors such as temperature, pressure, humidity, turbulence, wind speed, and wind direction.

Ground operation centers may identify and send weather bands to an aircraft for use in determining how weather may affect flight trajectory calculations. The weather bands identified may be based on current or predicted weather or flight plans, or may be default weather bands non-specific to a particular flight trajectory. Often, actual weather may impact a flight trajectory where the actual weather differs from the predicted weather used to calculate the predicted flight trajectory. Additionally, different factors en route may cause an aircrew to modify the flight plan and the weather information from the ground operation center, loaded during preflight, may no longer be accurate or up-to-date for the modified flight plan. Inaccurate or dated weather information can result in inefficiencies for flight operations, such as an increase in fuel consumption and emissions or delay in flight time, for example.

Therefore, it would be advantageous to have a method and apparatus that overcomes one or more of the issues described above as well as possibly other issues.

SUMMARY

One or more of the different advantageous embodiments provide a system comprising a weather band selection process and a processor unit. The processor unit is configured to run the weather band selection process. The weather band selection process identifies a flight trajectory associated with an aircraft, identifies current aircraft state data, identifies weather information for the flight trajectory, and identifies a weather band selection for the aircraft using the flight trajectory and the weather information.

One or more of the different advantageous embodiments may further provide a method for generating a weather band selection. In response to receiving a request for a weather band selection for a flight plan, weather information is identified for the flight plan. A number of weather bands is selected for the flight plan based on the weather information to form a weather band selection. The weather band selection is outputted.

One or more of the different advantageous embodiments may further provide a method for selecting weather bands. A current and predicted flight trajectory is identified for a first aircraft. Weather information is identified for a number of locations along the current and predicted flight trajectory. A number of weather bands is selected for the first aircraft based on the current and predicted flight trajectory and the weather information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
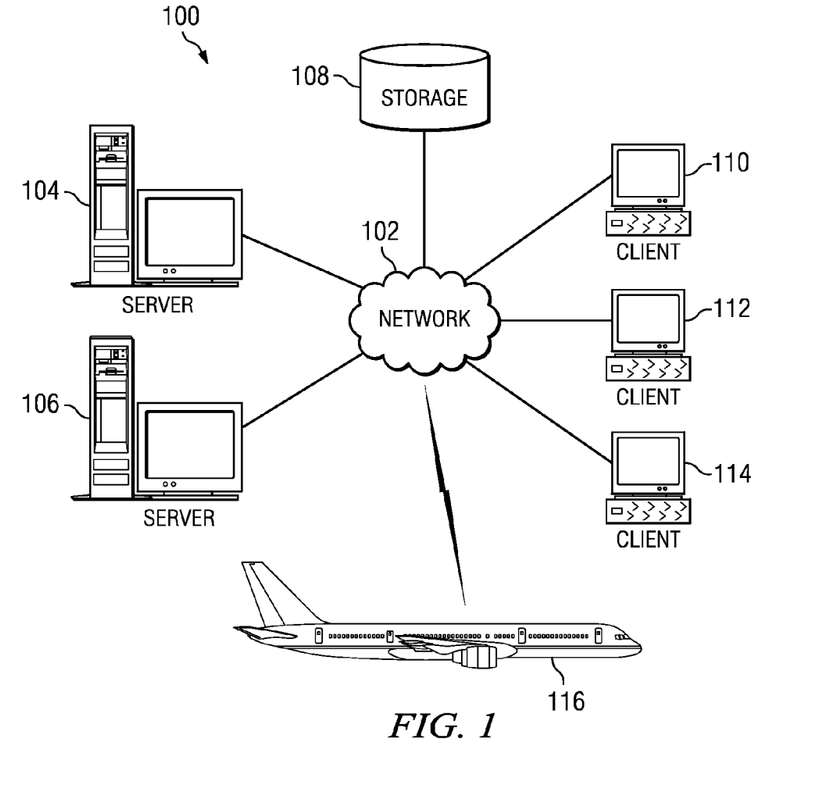
FIG. 1 is a pictorial representation of a network of data processing systems in which the advantageous embodiments of the present invention may be implemented.
Figure 2:
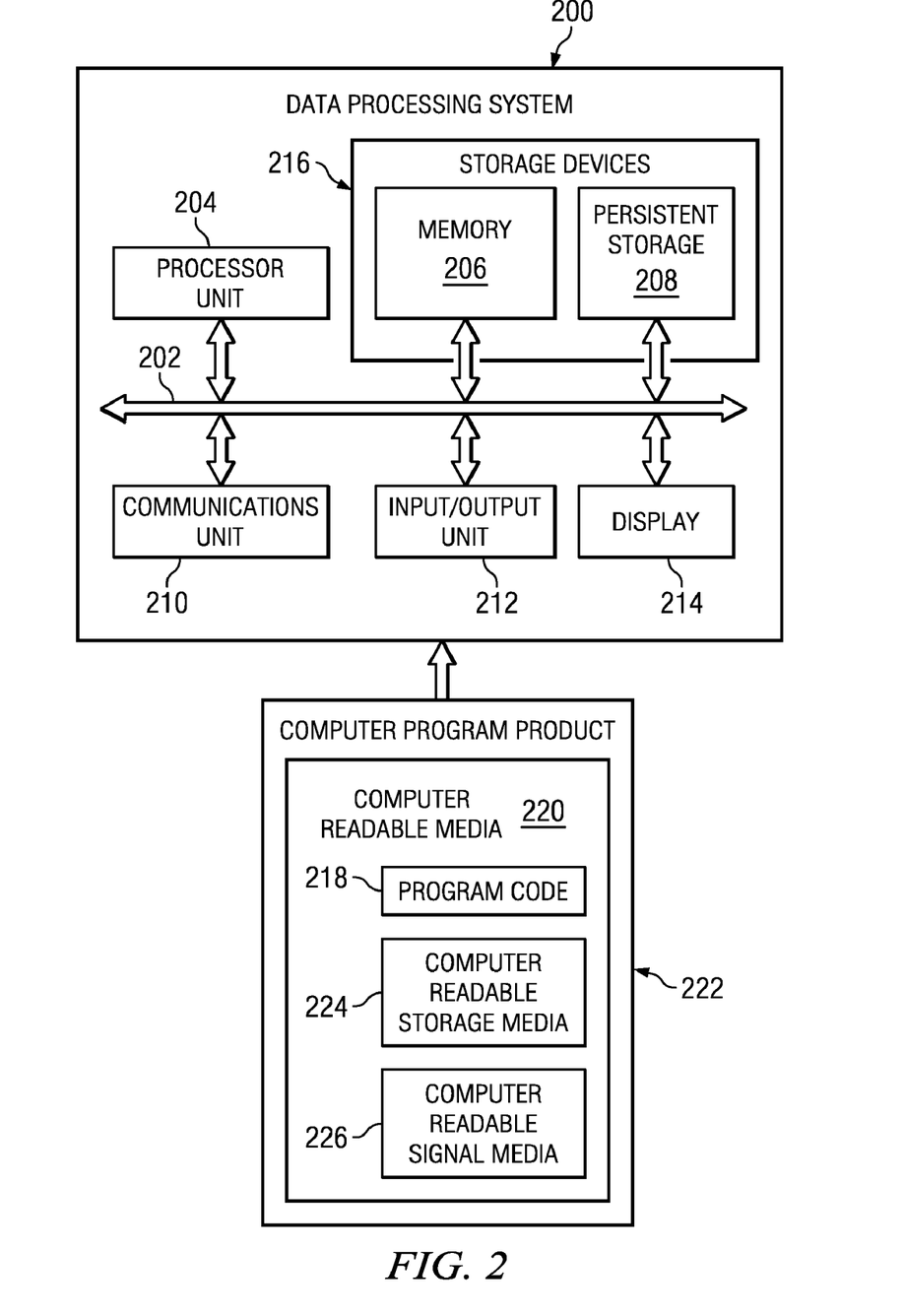
FIG. 2 is an illustration of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a block diagram of a data processing system is depicted in accordance with an advantageous embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account a number of different considerations. For example, the different advantageous embodiments recognize and take into account that currently used systems select default weather bands for an aircraft to use for flight trajectory calculations. These systems do not select dynamic weather bands. An example of a default weather band may be a selection of weather information for three different altitudes above a static location, such as an aircraft operation center for example. When default weather bands are selected, the same default altitudes are always chosen regardless of the surrounding circumstances. Even when default weather bands are selected, current methods increase inefficiencies in the flight trajectory calculations if the weather is out of date, not entered into a flight management computer, or provided at the wrong time. Additionally, current systems and methods do not consider the impact of environmental factors or aircraft events when choosing weather bands. Rather, current methods only consider winds at the chosen default altitudes, which can cause the aircraft to calculate undesired top-of-climb, top-of-descent, step climbs, or deceleration and acceleration points, for example.

The different advantageous embodiments further recognize and take into account that weather solutions for aircrew selected trajectory points may be requested during flight. An aircrew may desire weather solutions at waypoints along a secondary, alternative, or modified flight plan. Current systems also do not provide an opportunity to view current observed or forecasted weather before executing a flight plan modification for the aircrew. Rather, aircrews rely on human interpolation and manual entry for a flight plan modification, which may lead to data entry errors or less than optimized data entry.

The different advantageous embodiments further recognize and take into account that even in the rare cases where updated weather information is available, neither the aircrew nor the ground crew know which altitudes are pertinent to the flight trajectory for the aircraft. This lack of information increases inefficiencies in calculating changes to flight trajectories in a flight plan. As a result, currently used methods involve the selection of default altitudes regardless of the actual wind effects at different altitudes, if a selection is made at all.

The different advantageous embodiments recognize and take into account that it would be useful to have a method and apparatus for providing dynamic weather information. As an example, an identification of a number of weather bands for flight trajectory is desirable. A number, when referring to items, means one or more items. For example, a number of weather bands is one or more weather bands. Identifying a number of weather bands that are relevant to a flight plan and/or trajectory for an aircraft may provide for more accurate and efficient planning in operating the aircraft.

Thus, one or more of the different advantageous embodiments may provide a system comprising a weather band selection process and a processor unit. The processor unit is configured to run the weather band selection process. The weather band selection process identifies a flight trajectory associated with an aircraft, identifies weather information for the flight trajectory, and identifies a weather band selection for the aircraft using the flight trajectory, aircraft information and the weather information.

One or more of the different advantageous embodiments may further provide a method for generating a weather band selection. In response to receiving a request for a weather band selection for a flight plan, weather information is identified for the flight plan. A number of weather bands is selected for the flight plan based on the weather information to form a weather band selection. The weather band selection is outputted.

One or more of the different advantageous embodiments may further provide a method for selecting weather bands. A current and predicted flight trajectory is identified for a first aircraft. Weather information is identified for a number of locations along the current and predicted flight trajectory. A number of weather bands is selected for the first aircraft based on the current and predicted flight trajectory and the weather information.

Figure 3:
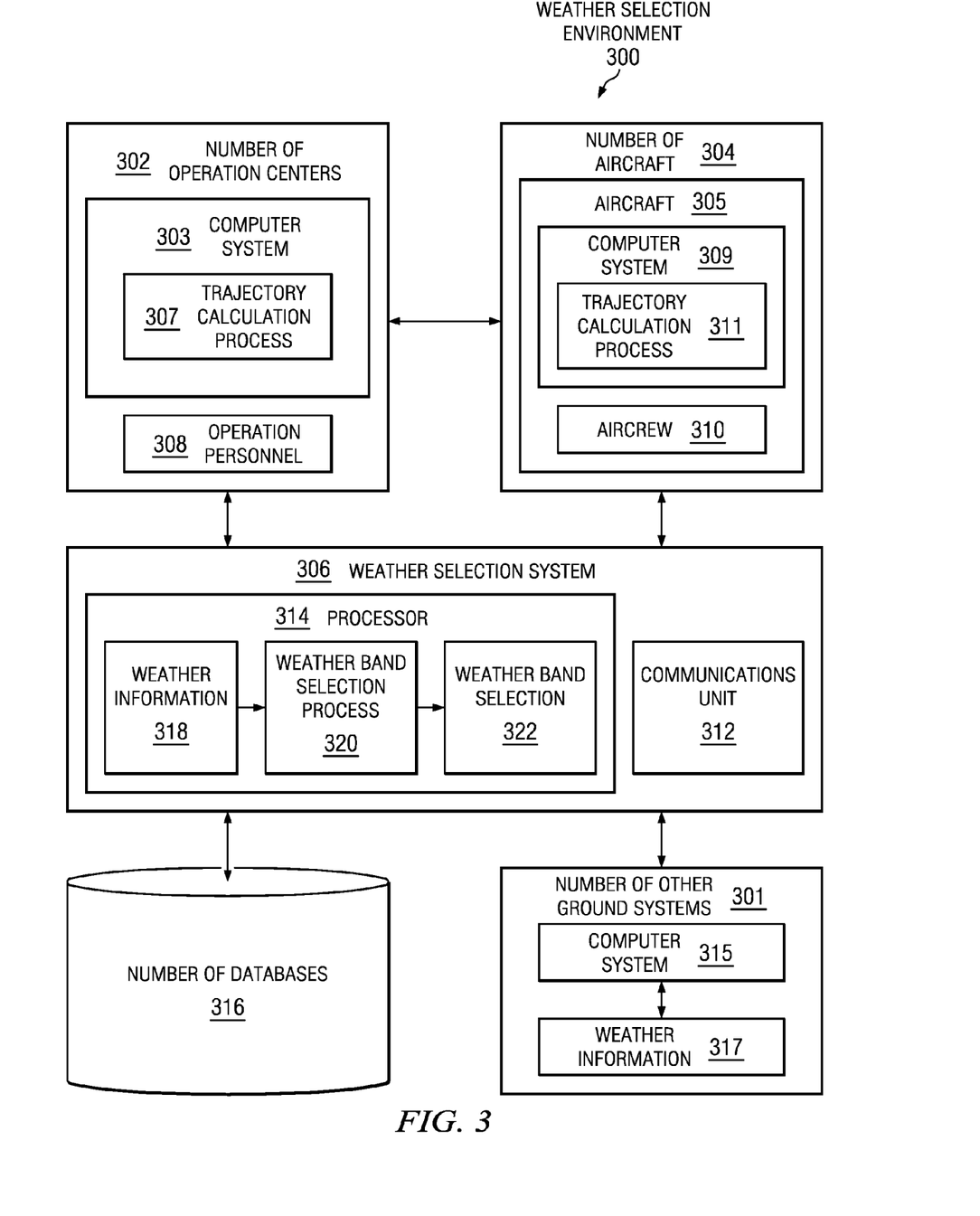
FIG. 3 is an illustration of a weather selection environment in accordance with an advantageous embodiment.

With reference now to FIG. 3, an illustration of a weather selection environment is depicted in accordance with an advantageous embodiment. Weather selection environment 300 may be implemented in an environment such as network 102 in FIG. 1.

Weather selection environment 300 includes number of other ground systems 301, number of operation centers 302, number of aircraft 304, and weather selection system 306. Number of operation centers 302 may include airline operation centers at various locations, and/or any other type of operation centers. Number of operation centers 302 includes computer system 303 and operation personnel 308. Computer system 303 may include a number of computers. As used herein, a number refers to one or more computers. The number of computers of computer system 303 may be networked in an environment such as network 102 in FIG. 1. Number of aircraft 304 may be any type of aircraft including, without limitation, jet engine aircraft, twin engine aircraft, single engine aircraft, spacecraft, and/or any other suitable type of aircraft. Aircraft 305 may be an example of one implementation of number of aircraft 304. Aircraft 305 includes computer system 309 and aircrew 310. Computer system 309 may include a number of computers. The number of computers of computer system 303 may be networked in an environment such as network 102 in FIG. 1. Number of other ground systems 301 may include, without limitation, weather reporting stations, weather monitoring stations, and/or any other suitable ground system.

In one advantageous embodiment, computer system 303 may also include trajectory calculation process 307. Trajectory calculation process 307 may be used to predict a trajectory for flight plan of an aircraft, such as aircraft 305, and send the trajectory to the aircraft. In another advantageous embodiment, computer system 309 of aircraft 305 includes trajectory calculation process 311. Trajectory calculation process 311 may be used to predict a trajectory of aircraft 305 using information received from weather selection system 306.

In one advantageous embodiment, weather selection system 306 is located in a remote location from number of operation centers 302 and number of aircraft 304. In this example weather selection system 306 may be operated by a third party service. Weather selection system 306 uses communications unit 312 to interact with number of operations centers 302 and number of aircraft 304. Weather selection system 306 may be implemented using one or more of data processing system 200.

Communications unit 312, in these examples, provides for communications with other data processing systems or devices. In these examples, communications unit 312 may be a network interface card. Communications unit 312 may provide communications through the use of either or both physical and wireless communications links. Communications unit 312 may be integrated with processor 314 and/or may be independent from and accessible to processor 314.

Processor 314 and/or communications unit 312 may access number of databases 316. Number of databases 316 may include various databases with information such as, ground weather, aircraft weather, aircraft state data, aircraft predictions, aircraft model identification, flight plans, and/or any other suitable information. Processor 314 may receive weather information 318. In one advantageous embodiment, weather information 318 may be accessed using number of databases 316. In another advantageous embodiment, weather information 318 may be received from number of operation centers 302, number of aircraft 304, aircraft 305, and/or number of other ground systems 301. In an illustrative example, operation personnel 308 of number of operation centers 302 may send updated weather information 318 to weather selection system 306. In another illustrative example, aircrew 310 of aircraft 305 may send observed weather information 318 to weather selection system 306. In yet another illustrative example, weather information 317 from number of other ground systems 301 may be transmitted to and/or retrieved by weather selection system 306 using computer system 315. Computer system 315 may be an example of one implementation of data processing system 200 in FIG. 2, for example.

Processor 314 includes weather band selection process 320. Weather band selection process 320 uses weather information 318 to generate weather band selection 322. Weather band selection 322 may then be sent to number of operation centers 302 and/or number of aircraft 304.

The illustration of weather selection environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one advantageous embodiment, communications unit 312 may be integrated with processor 314 in a manner illustrated by FIG. 2. In another advantageous embodiment, weather selection system 306 may be distributed across or located in at least one of a remote location, number of operation centers 302, and/or number of aircraft 304. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Figure 4:
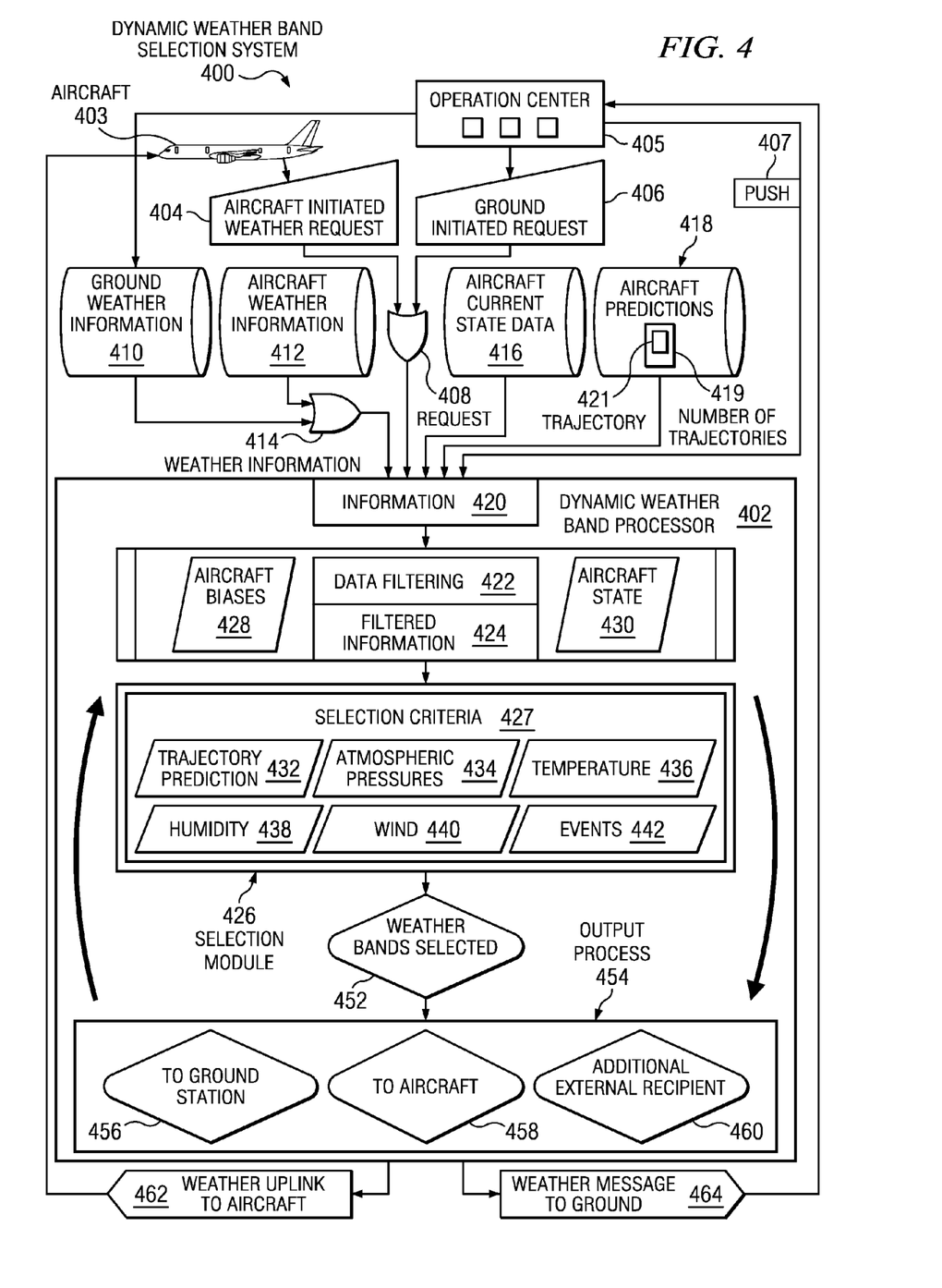
FIG. 4 is an illustration of a dynamic weather band selection in accordance with an advantageous embodiment.

Turning now to FIG. 4, an illustration of a weather band selection system is depicted in accordance with an advantageous embodiment. Dynamic weather band selection system 400 is an illustrative example of one implementation of weather selection system 306 in FIG. 3. Dynamic weather band selection system 400 may be implemented using a data processing system, such as data processing system 200 in FIG. 2.

Dynamic weather band selection system 400 includes dynamic weather band processor 402. Dynamic weather band processor 402 is configured to choose climb, cruise, and descent weather that are specific to a particular flight trajectory. The dynamic weather bands and weather information are chosen based on aircraft type, on-board equipage, current and forecasted weather, flight plan, phase of flight, aircraft events, aircraft state data, and the computed trajectory for the flight plan. Phase of flight may include, for example, without limitation, on-ground, climbing, cruising, descending, landing, and/or any other suitable phase of flight. Aircraft events may include, for example, without limitation, gear extension, gear retraction, flap extension, flap retraction, step climb points, step down points, and/or any other suitable aircraft event where there are changes in aircraft pitch, speed, and/or thrust.

In these illustrative examples, dynamic weather band processor 402 continually evaluates information received in order to dynamically select weather for a flight plan. In other illustrative examples, dynamic weather band processor 402 may be triggered to evaluate information by request 408, push 407, or some other event to dynamically select weather bands for a particular flight plan. Request 408 may be initiated by either aircraft initiated weather request 404 or ground initiated request 406. Request 408 may include a specific flight plan used by dynamic weather band processor 402 to dynamically select weather bands for the specific flight plan in response to request 408, for example. Push 407 may be an automatic push of a flight plan to dynamic weather band processor 402 to calculate a new weather solution before any request is made by an aircraft.

As additional illustrative examples, the event may be, for example, without limitation, receipt of updated weather information, a change in a flight plan, or some other suitable event.

Dynamic weather band processor 402 may receive information from a number of databases, such as ground weather information 410, aircraft weather information 412, aircraft current state data 416, and aircraft predictions 418. Ground weather information 410, aircraft weather information 412, aircraft current state data 416, and aircraft predictions 418 may be illustrative examples of one implementation of number of databases 316 in FIG. 3. Dynamic weather band processor 402 may also receive information directly from a number of aircraft and/or operation centers, such as aircraft 403 and operation center 405, for example.

Ground weather information 410 may include information collected from weather sources, such as, for example, without limitation, National Oceanic and Atmospheric Administration (NOAA). Ground weather information 410 may also include information about weather local to a particular operation center, forecasted weather information for a number of locations, and/or any other suitable type of ground weather information. Operation center 405 may be an illustrative example of one implementation of an operation center that sends weather information to ground weather information 410.

Aircraft weather information 412 may include weather directly reported or derived from a number of aircraft, such as number of aircraft 304 in FIG. 3, for example. Aircraft 403 may be an illustrative example of one implementation of an aircraft that directly sends currently observed weather information to aircraft weather information 412. Aircraft weather information 412 may include information such as, without limitation, temperature, pressure, turbulence, icing, wind speed, wind direction, wind vertical acceleration, and/or any other suitable information pertaining to a number of different points for a particular flight path and/or trajectory.

Dynamic weather band processor 402 may receive weather information 414 from a number of different sources, including, without limitation, ground weather information 410, aircraft weather information 412, aircraft 403, operation center 405, and/or any other suitable weather source. Dynamic weather band processor 402 is configured to evaluate weather information 414 when dynamically selecting weather bands for a particular flight plan and/or flight trajectory, for example.

Aircraft current state data 416 includes information pertaining to a number of aircraft, such as number of aircraft 304 in FIG. 3. Aircraft current state data 416 may include a number of unique identifiers for the number of aircraft, such as tail numbers for example. Aircraft current state data 416 may identify a particular aircraft and include current state information about that particular aircraft, such as, without limitation, on-ground, climbing, cruising, descending, altitude, heading, weight, center of gravity, speed, and/or any other suitable state data.

Aircraft predictions 418 may include a number of flight plans and associated predictions for the trajectory and weather of an aircraft based on each of the number of trajectories associated with the number of flight plans. Aircraft predictions 418 includes aircraft state data predictions associated with a number of points in time based on predicted weather, flight plan, weight of aircraft, aircraft configuration, and/or any other suitable information. Aircraft predictions 418 may include number of trajectories 419. Number of trajectories 419 are flight trajectories calculated from flight path information provided from either an aircraft or ground source. Number of trajectories 419 are calculated from the flight path information using flight path restrictions, such as altitude, speed, and/or time, and planned flight events, such as gear extension, for example.

Dynamic weather band processor 402 gathers information 420 for evaluation from ground weather information 410, aircraft weather information 412, aircraft current state data 416, and aircraft predictions 418. Dynamic weather band processor 402 passes the gathered information 420 through data filtering 422. Data filtering 422 is a filtering process that filters information 420 before passing filtered weather information 424 to selection module 426. Data filtering 422 and selection module 426 are illustrative examples of one implementation of weather band selection process 320 in FIG. 3. Data filtering 422 may include, for example, without limitation, aircraft biases 428 and aircraft state 430.

Data filtering 422 may filter information 420 based on factors such as, without limitation, where the information is coming from, what an aircraft was doing when the information was collected, system inconsistencies specific to particular aircraft, time of information transmission, aircraft speed, current aircraft altitude, current aircraft heading, current aircraft phase of flight, current aircraft state data, and/or any other type of factor. Aircraft biases 428 may reduce or increase the raw information received based on the factors considered. Aircraft state 430 may determine whether or not to use information received based on the factors considered. For example, certain types of aircraft movement may distort measurements. Aircraft state 430 may determine whether the state of an aircraft, such as aircraft 403, at the time information was obtained would invalidate the accuracy of the information. In one illustrative example, an aircraft in a turn, climb, or descent may affect certain parameters of information detections because of sensor position during those maneuvers. An example of a parameter that may be affected may be, without limitation, air pressure, which may in turn affect the accuracy of wind information. In this example, air pressure may be incorrectly measured, or sensed, due to a reduction or increase in airflow. An inaccurate air pressure measurement may result in an inaccurate airspeed measurement, which may lead to inaccurate wind information, for example. Aircraft state 430 analyzes the state of the aircraft at the time information was obtained to determine the integrity of the information.

Filtered information 424 may be sent from data filtering 422 to selection module 426. Selection module 426 processes filtered information 424 and applies selection criteria 427 to an aircraft trajectory received. In an illustrative example, trajectory 421 may be received in information 420 from number of trajectories 419 in aircraft predictions 418. Selection module 426 uses selection criteria 427 to determine the weather information pertinent to trajectory 421. Selection criteria 427 may include, without limitation, trajectory prediction 432, atmospheric pressures 434, temperatures 436, humidity 438, wind 440, events 442, and number of recipients 444. Selection module 426 uses trajectory prediction 432 to predict how trajectory 421 may change from its flight plan based on weather information 414 received in filtered information 424.

Events 442 are points along an aircraft trajectory where there are changes in aircraft pitch, speed, and/or thrust. Events 442 may include, for example, without limitation, flap extension, flap retraction, landing gear extension, landing gear retraction, deceleration and/or acceleration points to meet a time restriction, altitude restriction, and/or speed restriction, thermal anti-icing, step climb points, step down points, and/or any other suitable events that may affect trajectory 421.

Selection module 426 dynamically selects weather bands based on selection criteria 427 associated with request 408 or push 407 to form weather bands selected 452. Weather bands selected 452 may include a number of altitude weather bands ranked in order of importance and/or impact to the trajectory being considered from request 408. Weather bands selected 452 is then sent to output process 454. Dynamic weather band processor 402 uses output process 454 to determine how and where selected weather bands 452 should be sent. Output process 454 determines the recipient of weather bands selected 452 and formats weather bands selected 452 based on the recipient. Output process 454 may identify a number of data formats capable of being received by a particular recipient, such as aircraft 403 or operation center 405 for example. As used herein, a number of data formats refers to one or more data formats.

In one illustrative example, aircraft 403 may be able to receive weather bands selected 452 in any combination of data formats. The data formats may be, for example, without limitation, freetext, standard aircraft communications addressing and reporting system (ACARS) messaging, and/ or any other suitable data format. In another illustrative example, aircraft 403 may only be able to receive weather bands selected 452 in one specific data format compatible with systems of aircraft 403. In still another illustrative example, weather bands selected 452 may be sent in a specific data format preferred by operation center 405.

Selected weather bands 452 may be sent to any and/or all of ground station 456, aircraft 458, or additional external recipient 460. Additional external recipient 460 may be, without limitation, an air navigation service provider or other qualified subscriber, for example. In one illustrative example, selected weather bands 452 may be formatted for transmission to aircraft 458, and sent as weather uplink to aircraft 462. In another illustrative example, selected weather bands 452 may be formatted for transmission to ground station 456, and sent as weather message to ground 464.

The illustration of dynamic weather band selection system 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one advantageous embodiment, a manual request may be initiated from any qualified subscriber of the weather band selection system. In another advantageous embodiment, manual and automatic triggers can be used to reinitialize the process given a new set of conditions. An example of this may be flight plan modifications. In this example, one weather solution may have been computed according to the initial flight path of an aircraft, but the aircrew or a subscriber desires to view the solution using a different flight path before executing that maneuver. A request may be sent with the new proposed flight plan and a new solution may be generated, in this illustrative example.

Figure 5:
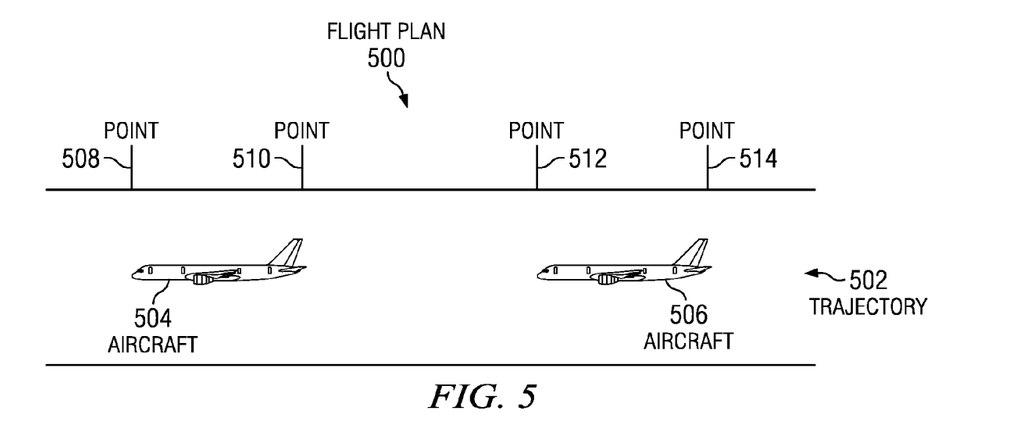
FIG. 5 is an illustration of a flight trajectory in accordance with an advantageous embodiment.

With reference now to FIG. 5, an illustration of a flight path is depicted in accordance with an advantageous embodiment. Flight plan 500 may be an illustrative example of one implementation of a flight path sent over request 408 in FIG. 4.

Flight path 500 may include trajectory 502. Aircraft 504 may travel along trajectory 502 earlier in time than aircraft 506. During the time that aircraft 504 follows trajectory 502 of flight path 500, aircraft 504 may experience various weather factors at different points along trajectory 502, such as point 508, point 510, point 512, and point 514. Aircraft 504 and aircraft 506 may directly relay weather information at each of points 508, 510, 512, and 514 to an operation center and/or aircraft weather database, such as operation center 405 or aircraft weather information 412 in FIG. 4, for example. Weather information may include, for example, without limitation, temperature, atmospheric pressure, turbulence, wind speed, wind direction, the altitude at which the weather is detected, the phase of flight during which the weather is detected, and/or any other suitable information.

When aircraft 506 follows trajectory 502 along flight path 500 at a later time than aircraft 504, aircraft 506 may receive the benefit of the weather information detected by aircraft 504 as well as the current weather detected by aircraft 506. The current weather detected by aircraft 506 may also be used to update the dated weather in the onboard computer of aircraft 506. The dated weather may be, for example, the weather detected earlier in time by aircraft 504, and/or weather information uploaded preflight into the onboard computer of aircraft 506. In an illustrative example, aircraft 506 may request weather band selections from a system, such as dynamic weather band selection system 400 in FIG. 4. The system can access the most recently acquired weather information for trajectory 502 to determine the weather information that is pertinent to aircraft 506. The information obtained by aircraft 504 along trajectory 502 may be used to anticipate the weather aircraft 506 will encounter on points 508, 510, 512, and 514 of trajectory 502 for flight path 500. Additionally, current weather detected by aircraft 506 along trajectory 502 may also be used to update onboard weather information and anticipate the weather aircraft 506 will encounter on upcoming points 508 and 510 along trajectory 502.

Figure 6:
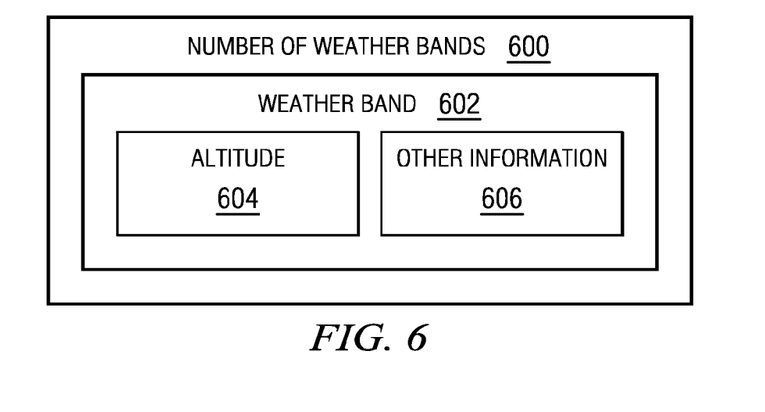
FIG. 6 is an illustration of a weather band in accordance with an advantageous embodiment.

With reference now to FIG. 6, an illustration of a weather band is depicted in accordance with an advantageous embodiment. Number of weather bands 600 may be an example of weather bands selected 452 in FIG. 4.

Number of weather bands 600 may include weather band 602. Weather band 602 includes information such as, without limitation, altitude 604 and other information 606. Other information may include, without limitation, temperature, atmospheric pressure, anti-ice levels, wind speed, wind direction, and/or any other suitable information specific to altitude 604.

The illustration of number of weather bands 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, number of weather bands 600 may include one or more weather bands in addition to weather band 602. In this example, each weather band may include weather information specific to the altitude of that weather band, just as other information 606 is specific to altitude 604 for weather band 602. As used herein, number refers to one or more weather bands.

Figure 7:
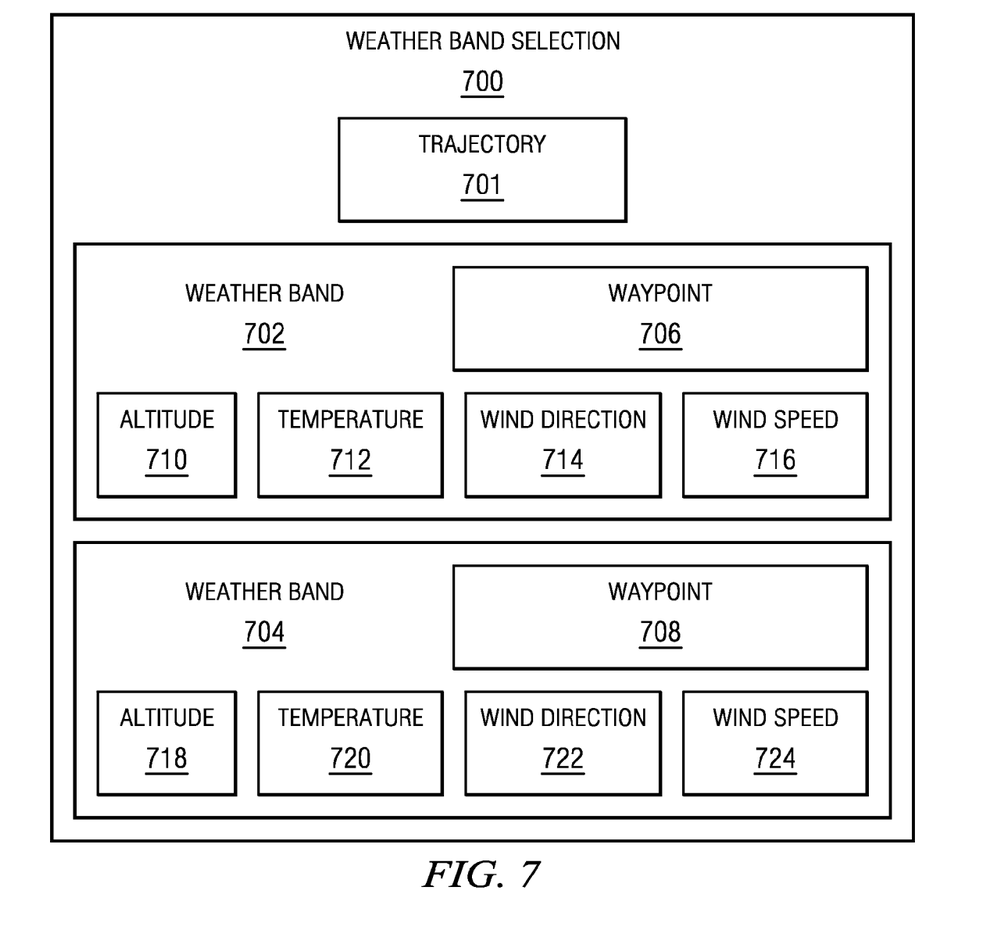
FIG. 7 is an illustration of a weather band selection in accordance with an advantageous embodiment.

With reference now to FIG. 7, an illustration of a weather band selection is depicted in accordance with an advantageous embodiment. Weather band selection 700 may be an illustrative example of one implementation of weather uplink to aircraft 462 from dynamic weather band selection system 400 in FIG. 4.

Weather band selection 700 is associated with trajectory 701. Trajectory 701 may have a number of associated waypoints for which weather information may be dynamically selected. Weather band selection 700 may have a number of associated weather bands, for example, weather band 702 and weather band 704. Weather band 702 may include weather information specific to waypoint 706. Weather band 704 may include weather information specific to waypoint 708. The weather information specific to waypoint 706 may include, for example, without limitation, altitude 710, temperature 712, wind direction 714, wind speed 716, and/or any other weather information for waypoint 706. The weather information specific to waypoint 708 may include, for example, without limitation, altitude 718, temperature 720, wind direction 722, wind speed 724, and/or any other weather information for waypoint 708.

Altitudes 710 and 718 may indicate, for example, without limitation, the specific altitude for each of the other weather information items provided for waypoints 706 and 708. For example, waypoint 706 may be at an altitude of 15,000 feet, while waypoint 708 may be at an altitude of 10,000 feet. Weather band selection 700 may be an illustrative example of a weather band selection for a cruise time phase of flight of a particular flight plan. The weather information provided by weather band selection 700 may be assessed along the known and intended trajectory 701 for the flight plan to determine the impact of the weather on trajectory 701, for example.

The illustration of weather band selection 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
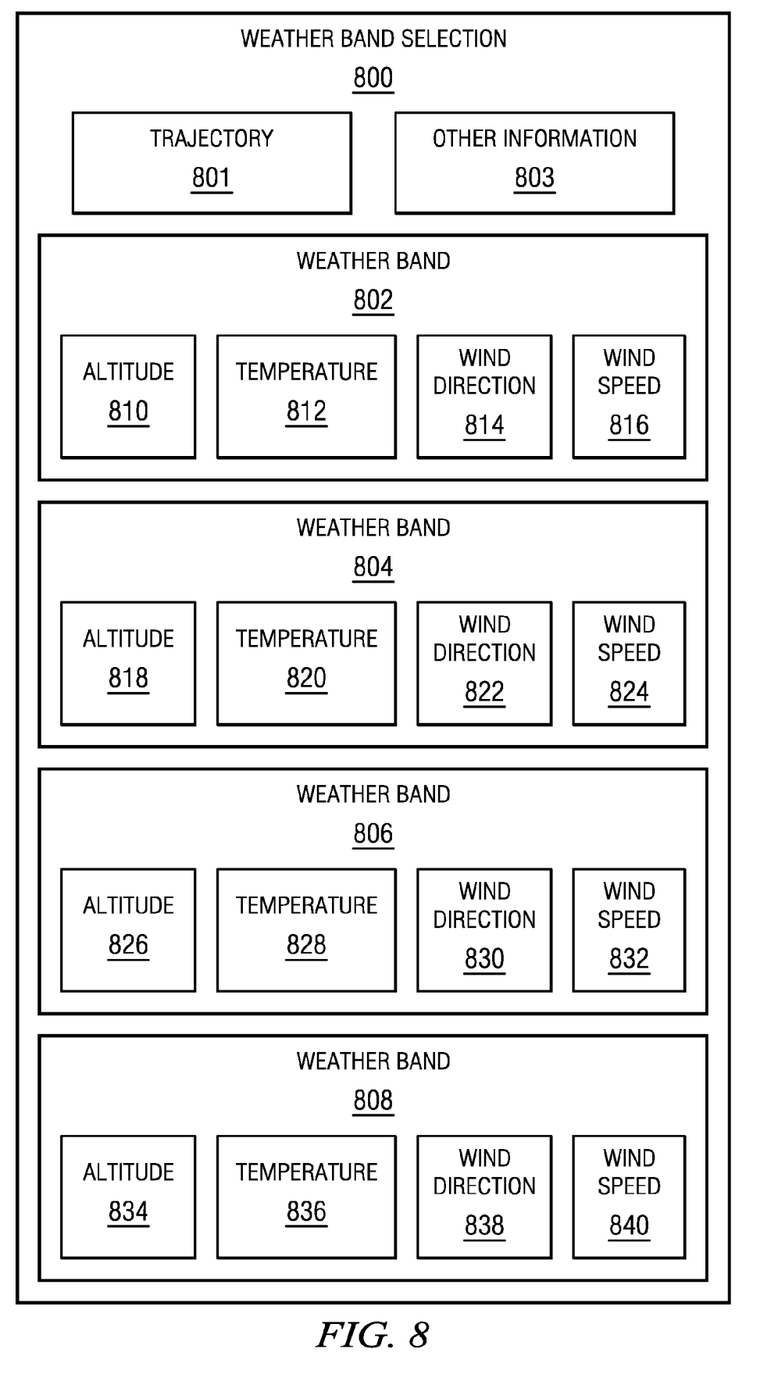
FIG. 8 is an illustration of a weather band selection in accordance with an advantageous embodiment.

For example, in some advantageous embodiments, if a flight phase for an aircraft is determined the weather band selection system 400 to be enroute cruise, both cruise winds, as illustrated by weather band selection 700, and descent winds, as illustrated by weather band selection 800, may be provided to the aircraft along trajectory 701. In another advantageous embodiment, if a flight phase of climb is determined for an aircraft, both climb winds and cruise winds may be provided in a weather band selection.

With reference now to FIG. 8, an illustration of a weather band selection is depicted in accordance with an advantageous embodiment. Weather band selection 800 may be an illustrative example of one implementation of weather uplink to aircraft 462 from dynamic weather band selection system 400 in FIG. 4.

Weather band selection 800 depicts a weather band selection for trajectory 801. Weather band 802, 804, 806, and 808 may include a number of descent altitude bands providing information specific to the number of different altitude ranges that will be encountered during the descent of an aircraft along a trajectory for a specific flight plan, for example. Weather band selection 800 may also include other information 803. Other information 803 may be weather information that is specific to a phase of flight rather than an altitude, altitude range, waypoint or specific weather band. Examples of other information 803 may include, without limitation, thermal anti-icing for engine bleeds, temperature deviations from standard atmospheric temperatures, barometric pressure, and/or any other suitable information related to a phase of flight.

Weather band 802 may include weather information specific to altitude 810. The weather information for altitude 810 may include, without limitation, temperature 812, wind direction 814, wind speed 816, and/or any other suitable weather information.

Weather band 804 may include weather information specific to altitude 818. The weather information for altitude 818 may include, without limitation, temperature 820, wind direction 822, wind speed 824, and/or any other suitable weather information.

Weather band 806 may include weather information specific to altitude 826. The weather information for altitude 826 may include, without limitation, temperature 828, wind direction 830, wind speed 832, and/or any other suitable weather information. Weather band 808 may include weather information specific to altitude 834. The weather information for altitude 834 may include, without limitation, temperature 836, wind direction 838, wind speed 840, and/or any other suitable weather information.

Each of altitude 810, altitude 818, altitude 826, and altitude 834 may be, for example, without limitation, a discrete altitude or an altitude range. In one illustrative example of discrete altitudes, altitude 810 may be 30,000 feet, altitude 818 may be 35,000 feet, altitude 826 may be 37,500 feet, and altitude 834 may be 40,000 feet. In this example of discrete altitudes, each of altitudes 810, 818, 826, and 834 may also represent a boundary, or range, between discrete altitudes identified by each of altitudes 810, 818, 826, and 834. In other words, a range between altitude 810 and altitude 818 may be an altitude range of 30,000 feet to 35,000 feet, in this example. If weather bands 818 and 826 were not provided in weather band selection 800, a range between altitude 810 and altitude 834 may be an altitude range of 30,000 feet to 40,000 feet, for example. In this advantageous embodiment, additional weather bands may provide for an increasingly broad range of overall altitudes for a weather band selection.

In another illustrative example of altitude ranges, altitude 810 may represent 30,000-32,500 feet, altitude 818 may represent 32,500-35,000 feet, altitude 826 may represent 35,000-37,500 feet, and altitude 834 may represent 37,500-40,000 feet. In this example, weather information associated with altitude 810 may be information about weather occurring in the altitude range of 30,000-32,500 feet. Based on the weather associated with an altitude, or altitude range, an aircraft may change its vertical profile to avoid certain types of weather. Changing vertical profile may include, for example, ascending or descending from a current cruise altitude.

The illustration of weather band selection 800 in FIG. 8 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, other information 803 may be implemented in combination with weather band 802, weather band 804, weather band 806, and/or weather band 808.

Figure 9:
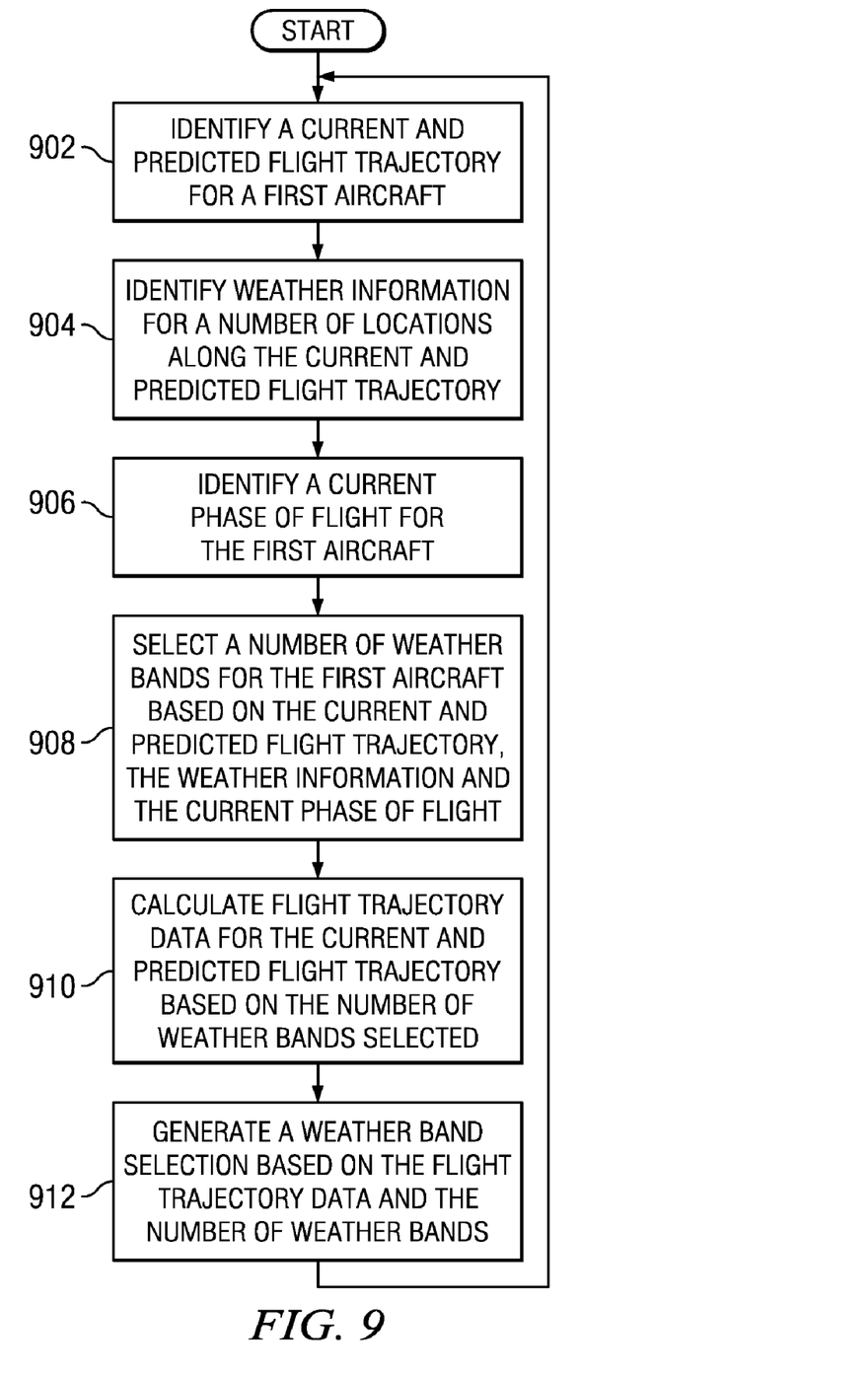
FIG. 9 is an illustration of a process for dynamically selecting weather bands in accordance with an advantageous embodiment.

With reference now to FIG. 9, an illustration of a process for dynamically selecting weather bands is depicted in accordance with an advantageous embodiment. The process in FIG. 9 may be implemented by a component such as dynamic weather band selection system 400 in FIG. 4. The process in FIG. 9 may occur during flight of an aircraft and/or while an aircraft is on the ground.

The process begins by identifying a current and predicted flight trajectory for a first aircraft (operation 902), such as trajectory 421 in FIG. 4, for example. The process identifies weather information for a number of locations along the current and predicted flight trajectory (operation 904). The weather information may be identified using a number of weather sources such as, for example, without limitation, ground weather information 410, aircraft weather information 412, a second aircraft on the current and predicted flight trajectory, and/or any other suitable weather source. The process identifies a current phase of flight for the first aircraft (operation 906). The current phase of flight may include, for example, without limitation, on-ground, climbing, cruising, descending, and landing. The process then selects a number of weather bands for the first aircraft based on the current and predicted flight trajectory, the weather information, and the current phase of flight (operation 908). The process calculates flight trajectory data for the current and predicted flight trajectory based on the number of weather bands selected (operation 910). The process then generates a weather band selection based on the flight trajectory data and the number of weather bands (operation 912), and returns to operation 902.

The process depicted in FIG. 9 may be a continual process of dynamically selecting weather bands in order to provide the most up-to-date weather information for a flight plan and/or trajectory. In another advantageous embodiment, the process depicted in FIG. 9 may be initiated by a request, such as request 408 or push 407 in FIG. 4, for example. The weather band selection generated in FIG. 9 may be sent to a number of recipients, including, without limitation, an aircraft, an operation center, a ground system, an external recipient, and/or any other suitable recipient.

Figure 10:
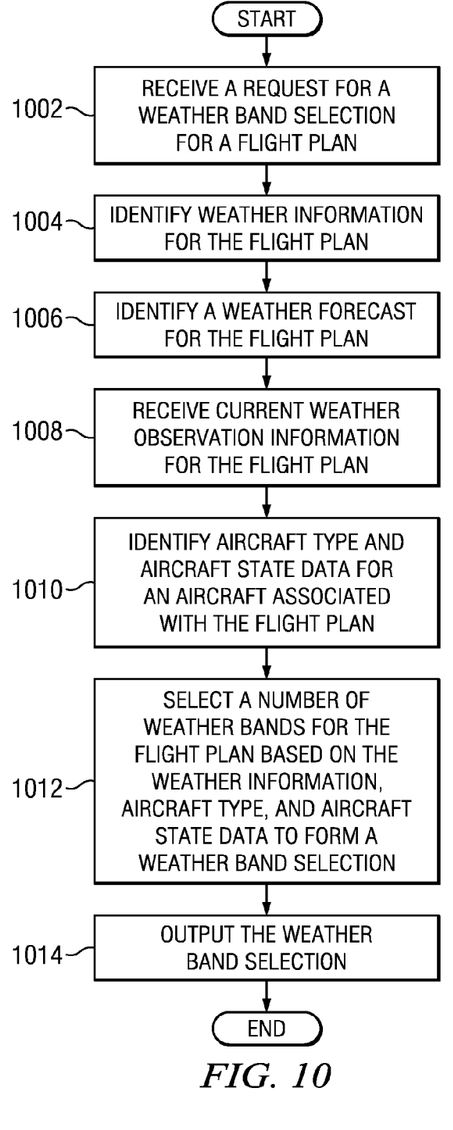
FIG. 10 is an illustration of a process for generating a weather band selection in accordance with an advantageous embodiment.

With reference now to FIG. 10, an illustration of a process for generating a weather band selection is depicted in accordance with an advantageous embodiment. The process in FIG. 10 may be implemented by a component such as dynamic weather band selection system 400 in FIG. 4. The process in FIG. 10 may occur during flight of an aircraft and/or while an aircraft is on the ground.

The process begins by receiving a request for a weather band selection for a flight plan (operation 1002). The flight plan may be received through a request, such as request 408 in FIG. 4, or through an information push, such as push 407 in FIG. 4. The process identifies weather information for the flight plan (operation 1004). The process then identifies a weather forecast for the flight plan (operation 1006). The process receives current weather observation information for the flight plan (operation 1008). The process then identifies an aircraft type and aircraft state data for an aircraft associated with the flight plan (operation 1010). Aircraft state data may include, for example, without limitation, climbing, cruising, and descending. The process selects a number of weather bands for the flight plan based on the weather information, aircraft type, and aircraft state data to form a weather band selection (operation 1012). The number of weather bands may include weather information, such as, without limitation, altitude, temperature, atmospheric pressure, wind speed, wind direction, anti-thermal icing, and turbulence, for example. Next, the process outputs the weather band selection (operation 1014) with the process terminating thereafter. The weather band selection may be outputted to a number of recipients, including, without limitation, an aircraft, an operation center, a ground system, an external recipient, and/or any other suitable recipient.

The illustration of the process for providing a weather selection in FIG. 10 is not meant to imply physical or architectural limitations to the manner in which different advantageous embodiments may be implemented. Other steps in addition to and/or in place of the ones illustrated may be used. Some steps may be unnecessary in some advantageous embodiments. Also, the different operations are presented to illustrate one example of a functional process. One or more of these operations may be combined and/or divided into different operations when implemented in different advantageous embodiments. Additionally, one or more of these operations may be performed in a different order than depicted in different advantageous embodiments.

Figure 11:
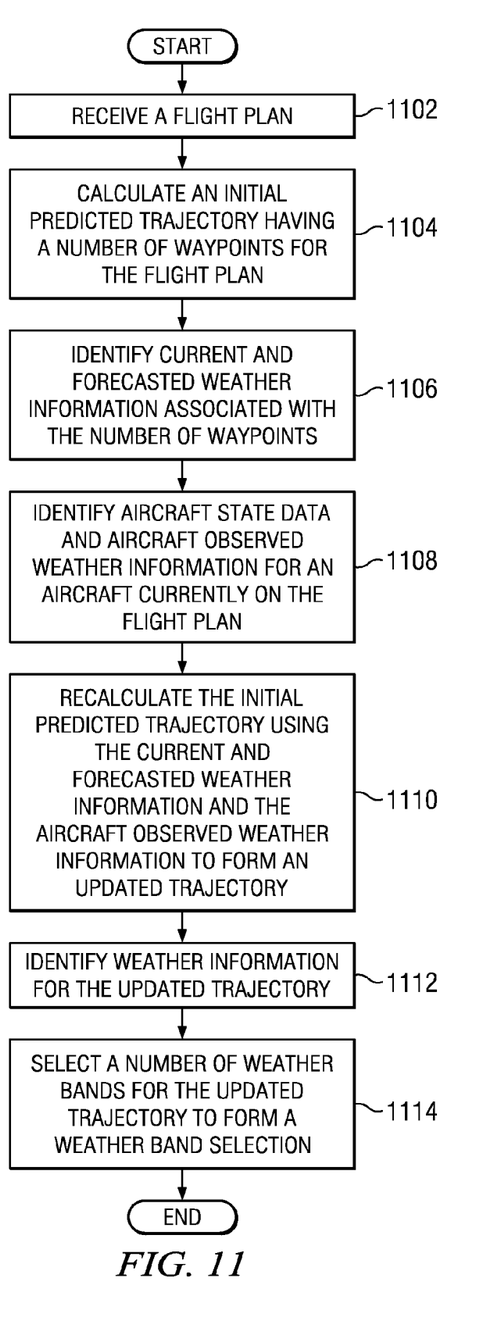
FIG. 11 is an illustration of a process for selecting weather bands in accordance with an advantageous embodiment.

With reference now to FIG. 11, an illustration of a process for selecting weather bands is depicted in accordance with an advantageous embodiment. The process in FIG. 11 may be implemented by a component such as dynamic weather band selection system 400 in FIG. 4. The process in FIG. 11 may occur during flight of an aircraft and/or while an aircraft is on the ground.

The process begins by receiving a flight plan (operation 1102). The process calculates an initial predicted trajectory having a number of waypoints for the flight plan (operation 1104). The number of waypoints may be, for example, waypoint 706 and waypoint 708 of FIG. 7. The process then identifies current and forecasted weather information associated with the number of waypoints (operation 1106). The process identifies aircraft state data and aircraft observed weather information for an aircraft currently on the flight plan (operation 1108). Next, the process recalculates the initial predicted trajectory using the current and forecasted weather information and the aircraft observed weather information to form an updated trajectory (operation 1110). The process identifies weather information for the updated trajectory (operation 1112). The process then selects a number of weather bands for the updated trajectory to form a weather band selection (operation 1114), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a system comprising a weather band selection process and a processor unit. The processor unit is configured to run the weather band selection process. The weather band selection process identifies a flight plan associated with an aircraft, identifies weather information for the flight plan, and identifies a weather band selection for the aircraft using the flight plan and the weather information.

The different advantageous embodiments provide a system that selects pertinent and relevant weather bands for a specific flight plan or trajectory. The weather band selection is therefore more accurate and up-to-date than preflight selections or default selections. This increases the efficiency of flight operations and the accuracy of flight trajectory calculations and calculation predictions when a flight plan is modified. More efficient flight operations result in a decrease of fuel consumption and environmental emissions.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
a weather band selection process; and
a processor unit configured to run the weather band selection process, wherein the weather band selection process identifies a flight trajectory associated with an aircraft, identifies information regarding the aircraft other than the flight trajectory, identifies weather information for the flight trajectory, and identifies a weather band selection for the aircraft using the flight trajectory, the information regarding the aircraft other than the flight trajectory, and the weather information,
wherein the weather band selection comprises
weather information for a first plurality of altitudes at a waypoint of the flight trajectory for a phase of flight of the aircraft other than a climb phase of flight or a descent phase of flight, and
weather information for a second plurality of altitudes for the climb phase of flight or the descent phase of flight, wherein the second plurality of altitudes are altitudes encountered by the flight trajectory for the climb phase of flight or the descent phase of flight.

2. The system of claim 1, wherein the weather band selection process detects an event that initiates identification of the weather band selection.

3. The system of claim 1, wherein the weather band selection process sends the weather band selection to at least one of the aircraft, an operation center, and a ground system.

4. The system of claim 1, wherein the weather information comprises at least one of temperature, wind speed, wind direction, pressure, and anti-thermal icing information.

5. The system of claim 1, wherein the information regarding the aircraft other than the flight trajectory comprises aircraft state data.

6. The system of claim 1, wherein the information regarding the aircraft other than the flight trajectory comprises one or more events.

7. The system of claim 6, wherein the one or more events are selected from the group consisting of a gear extension, a gear retraction, a flap extension, a flap retraction, one or more step climb points, one or more step down points, and an aircraft event where there are changes in aircraft pitch, speed, or thrust.

8. The system of claim 1, wherein the information regarding the aircraft other than the flight trajectory comprises one or both of aircraft type or on-board equipage.

9. The system of claim 1, further comprising:
a trajectory calculation process configured to predict a second trajectory for a flight plan of the aircraft based on the weather band selection.

10. The system of claim 9, further comprising:
a selection module configured to predict how the flight trajectory may change from a flight plan based on the weather band selection.

11. A method for selecting weather bands, the method comprising:
identifying a flight trajectory for a first aircraft;
identifying weather information for a number of locations along the flight trajectory; and
selecting a first plurality of weather bands for a waypoint of the flight trajectory based on the flight trajectory and the weather information.

12. The method of claim 11, further comprising:
selecting a second plurality of weather bands based on the flight trajectory, wherein the second plurality of weather bands comprises weather information for a plurality of altitudes encountered by the flight trajectory for a climb phase of flight or a descent phase of flight.

13. The method of claim 11, further comprising:
sending the first plurality of weather bands to at least one of an aircraft and an operation center.

14. The method of claim 11, wherein the identifying and selecting steps are performed responsive to a request.

15. The method of claim 11, wherein the identifying and selecting steps are performed autonomously and continually.

16. The method of claim 11, wherein the weather information is obtained from a second aircraft on the flight trajectory.

17. The method of claim 11, wherein the weather information is obtained from a number of weather sources.

18. The method of claim 11, wherein the plurality of weather bands comprise at least one of temperature, wind speed, wind direction, pressure, and anti-thermal icing information for a plurality of altitudes at the waypoint of the flight trajectory.

19. The method of claim 11, wherein the first plurality of weather bands are selected based on a phase of flight for the first aircraft at the waypoint of the flight trajectory, wherein the phase of flight is at least one of on-ground, climbing, cruising, descending, and landing.

20. A method for generating a weather band selection, the method comprising:
responsive to receiving a request for a weather band selection for a flight plan, identifying weather information for the flight plan;
selecting a number of weather bands for the flight plan based on the weather information to form a weather band selection;
outputting the weather band selection;
calculating an initial predicted flight trajectory having a number of waypoints;
identifying current and forecasted weather information associated with the number of waypoints; and
selecting a plurality of weather bands for each of the number of waypoints.

21. The method of claim 20, wherein identifying the weather information further comprises:
identifying a weather forecast for the flight plan; and
receiving current weather observation information for the flight plan.

22. The method of claim 20, wherein selecting the number of weather bands for the flight plan further comprises:
selecting the number of weather bands for the flight plan using aircraft type and aircraft state data for an aircraft associated with the flight plan.

23. The method of claim 22, wherein the aircraft state data includes at least one of climbing, cruising, and descending.

24. The method of claim 20, wherein the plurality of weather bands for each of the number of waypoints comprise weather information for a plurality of altitudes at each of the number of waypoints.

25. The method of claim 24, wherein the weather information includes at least one of altitude, temperature, atmospheric pressure, wind speed, wind direction, anti-thermal icing, and turbulence.

* * * * *